United States Patent [19]
Nishiura

[11] Patent Number: 6,031,563
[45] Date of Patent: Feb. 29, 2000

[54] VIDEO TELEPHONE SYSTEM HAVING FUNCTION OF REPELLING MISCHIEVOUS CALL

[75] Inventor: Sachiko Nishiura, Tokyo, Japan

[73] Assignee: NEC Corporation, Tokyo, Japan

[21] Appl. No.: 09/221,118

[22] Filed: Dec. 28, 1998

[30] Foreign Application Priority Data

Dec. 26, 1997 [JP] Japan .................................. 9-359469

[51] Int. Cl.[7] .................................................. H04N 7/14
[52] U.S. Cl. ............................ 348/14; 348/15; 379/93.17
[58] Field of Search .................... 348/14, 15; 379/93.17, 379/93.21, 410, 411, 406; H04N 7/14

[56] References Cited

FOREIGN PATENT DOCUMENTS

| | | |
|---|---|---|
| 1-295582 | 11/1989 | Japan . |
| 2-16647 | 2/1990 | Japan . |
| 402233048A | 9/1990 | Japan .............................. H04M 1/66 |
| 3-166888 | 7/1991 | Japan . |
| 4-273686 | 9/1992 | Japan . |
| 6-303314 | 10/1994 | Japan . |
| 8-46937 | 2/1996 | Japan . |
| 409107399A | 4/1997 | Japan .............................. H04M 1/66 |

*Primary Examiner*—Curtis A. Kuntz
*Assistant Examiner*—Melur Ramakrishnaiah
*Attorney, Agent, or Firm*—Foley &Lardner

[57] ABSTRACT

In a video telephone system including an audio inputting unit, an audio compression module, an image inputting unit, an image compression module and a multiplexing module on a transmitting side, and a demultiplexing module, an audio expansion module, an image expansion module, an audio outputting unit, and an image outputting unit on a receiving side, an image processing numerical value specifying module modifies arithmetic coefficients for processing expanded image data, expanded by the image expansion module. A processing switching module transmits expanded audio data and expanded image data to the audio outputting unit and the image outputting unit, respectively, in a first state and also transmits the expanded audio data and the expanded image data to the audio compression module and the image compression module, respectively in a second state. In the latter case, the expanded image data is transmitted via the image processing numerical value specifying module to the image compression module.

6 Claims, 17 Drawing Sheets

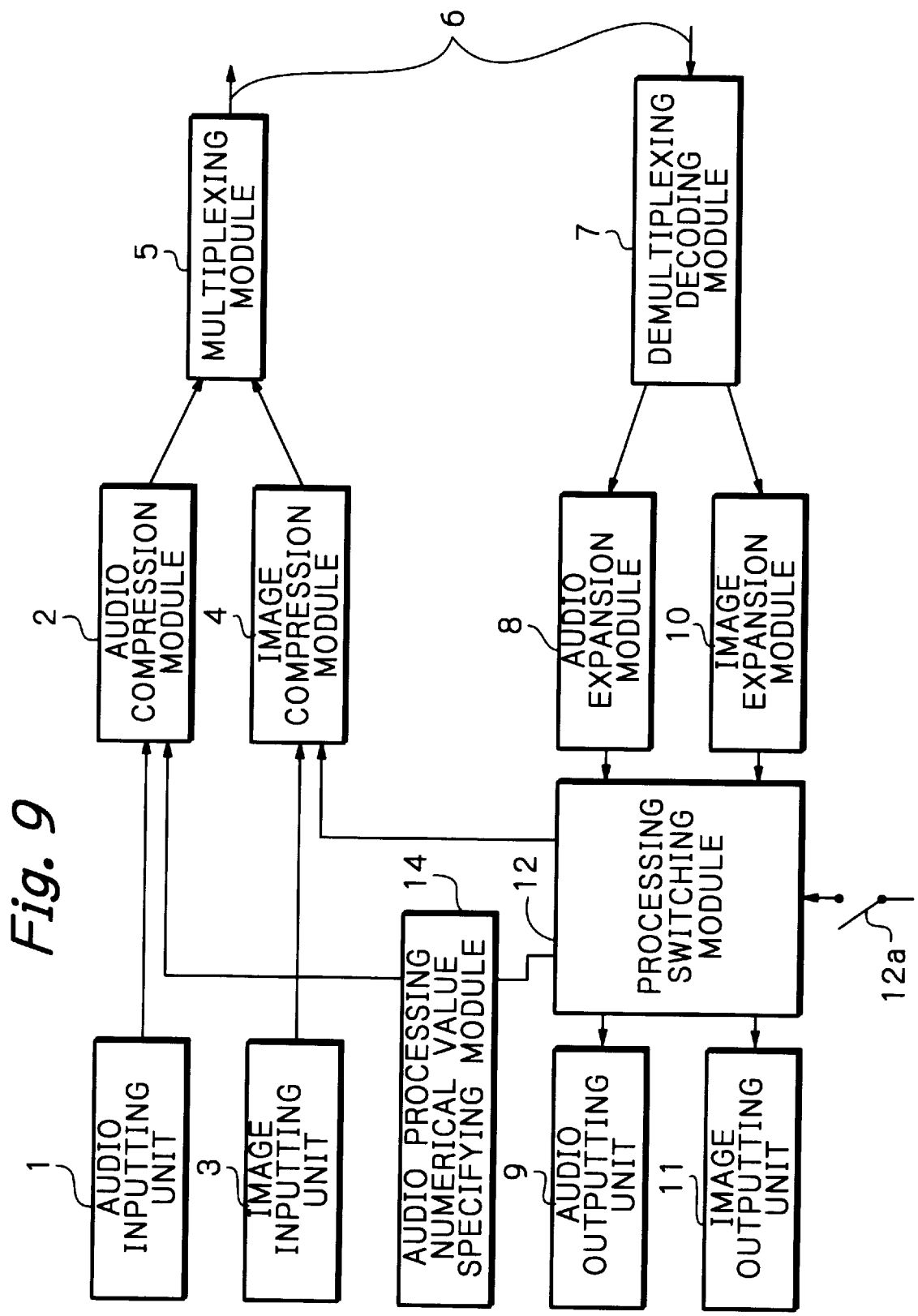

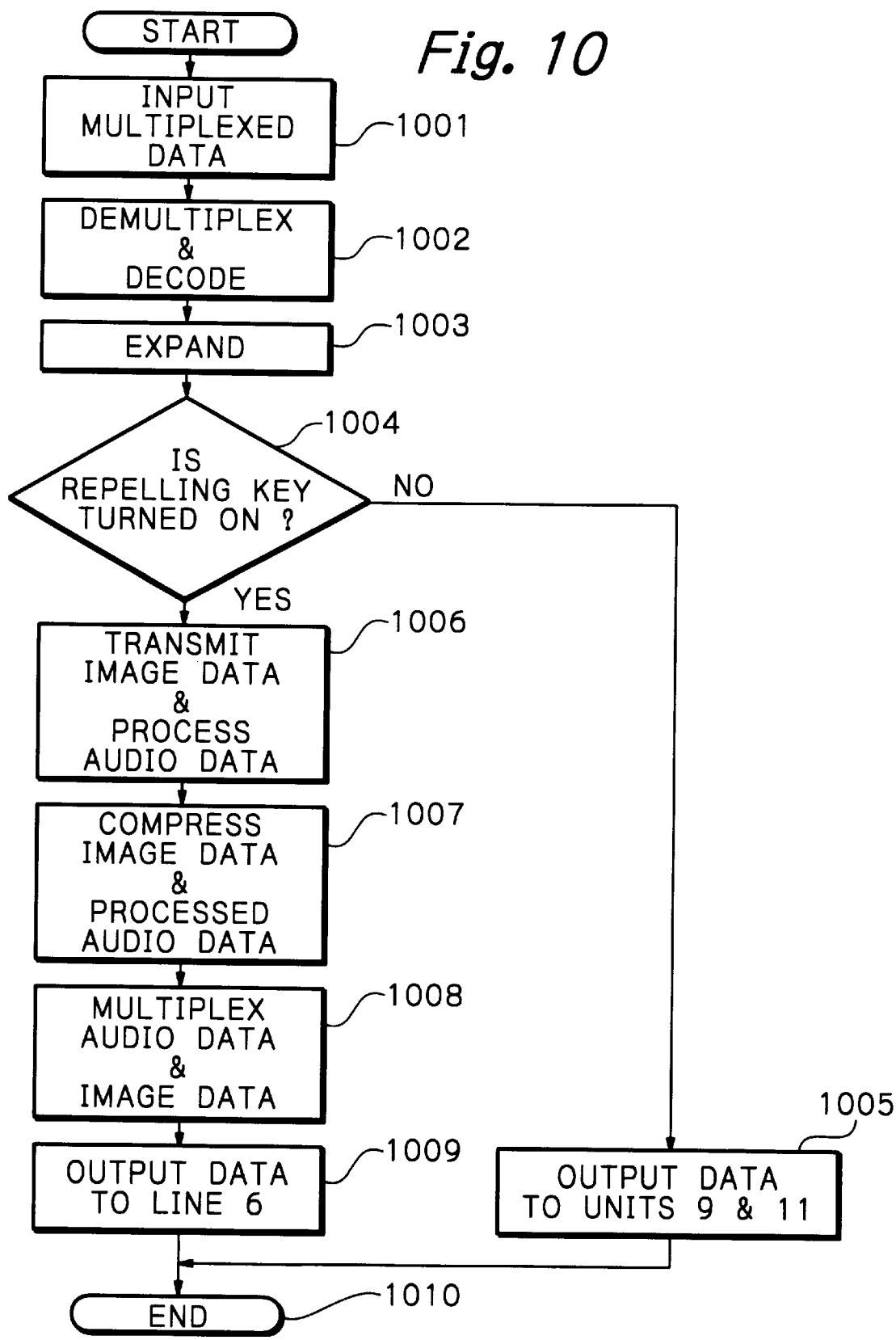

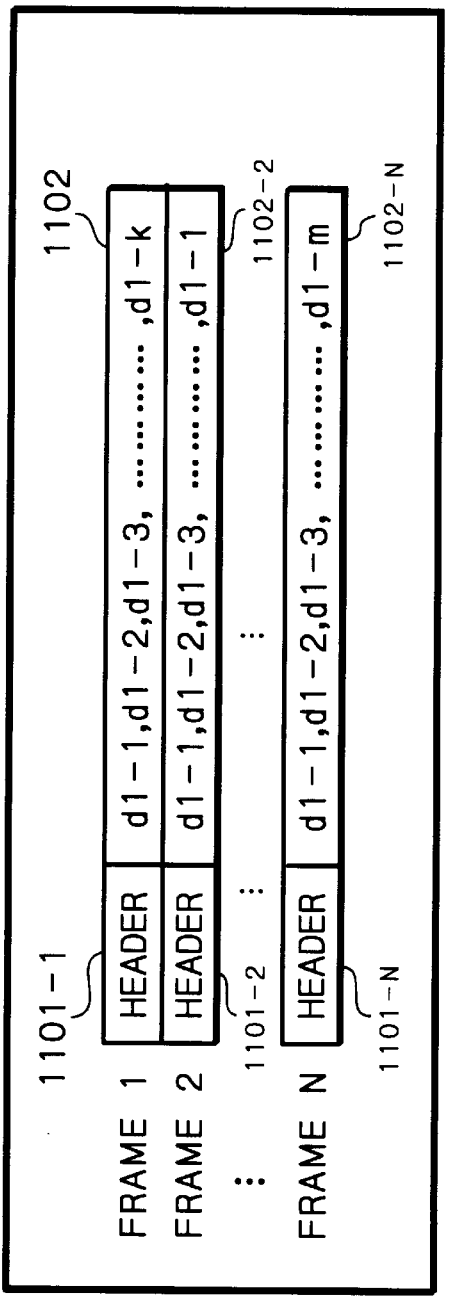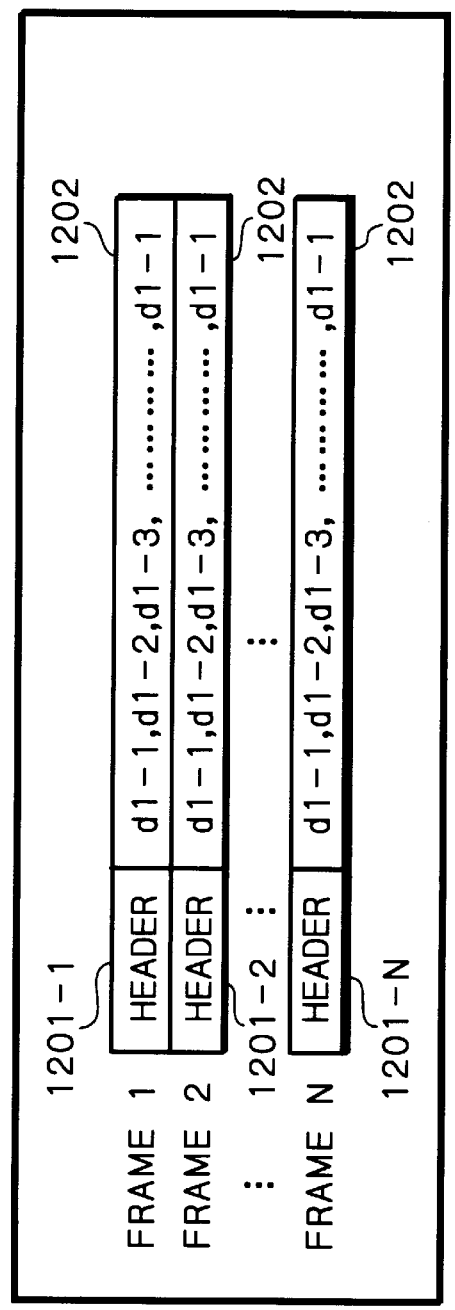

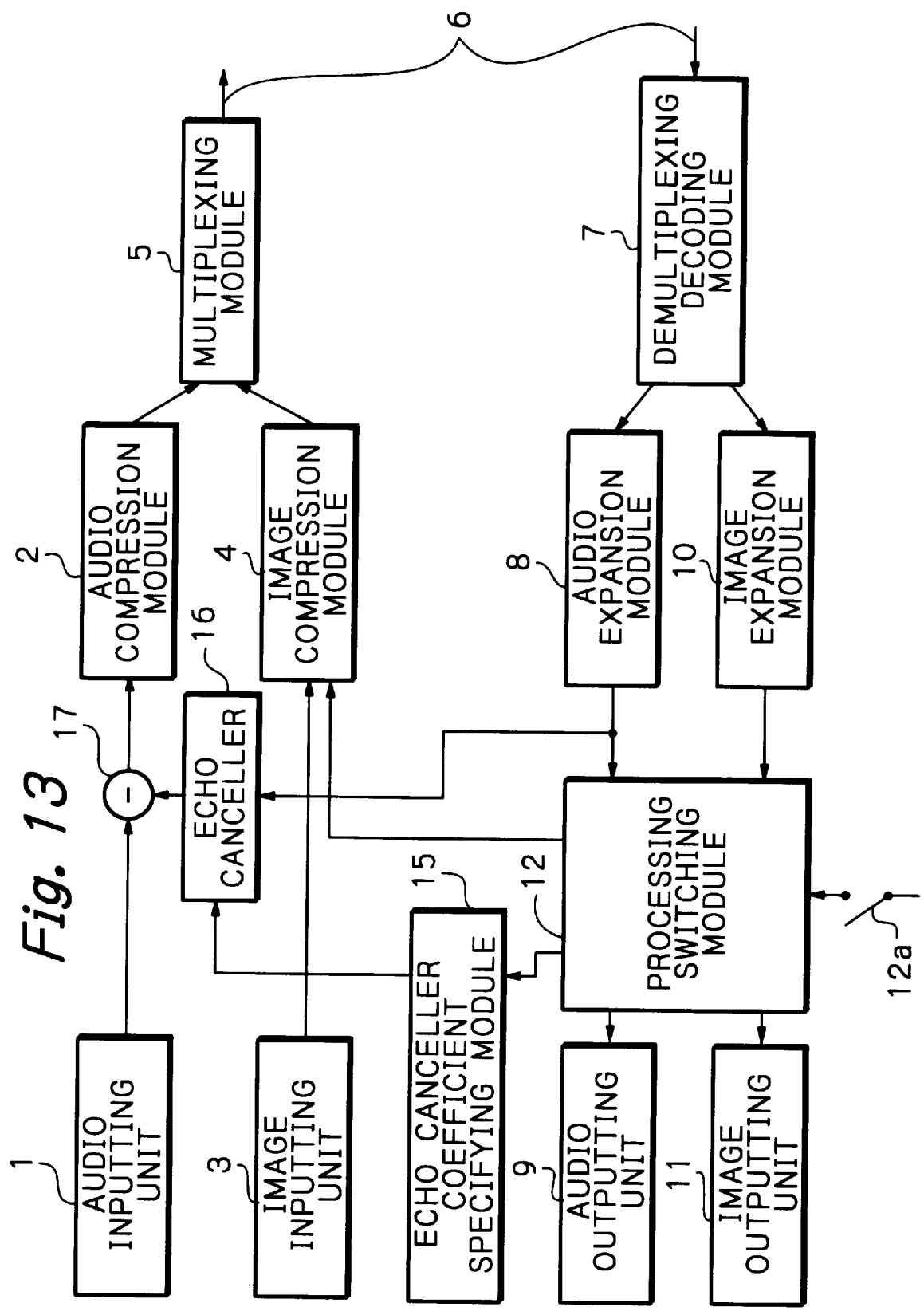

VIDEO TELEPHONE SYSTEM HAVING FUNCTION OF REPELLING MISCHIEVOUS CALL

BACKGROUND OF THE INVENTION

1. Field of the Invention

The present invention relates to a video telephone system having a function of repelling a mischievous call.

2. Description of the Related Art

Various video telephone systems having a function of repelling mischievous calls have been proposed.

In a first prior art video telephone system (see: JP-A-1-295582), the image and voice of a mischievous caller are simply fed back to the mischievous caller. This will be explained later.

In the first prior art video telephone system however, the effect of repelling the mischievous call and preventing any possible second mischievous call is doubtful.

In a second prior art video telephone system (see: JP-A-6-303314), a novel processing means for generating special data (image data and character data) is provided to produce a remarkable effect on a mischievous caller. This also will be explained later in detail.

In the second prior art video telephone system, however, an additional load is required.

SUMMARY OF THE INVENTION

It is an object of the present invention to provide a video telephone system capable of effectively repelling a mischievous call without adding a special load.

According to the present invention, in a video telephone system including an audio inputting unit, an andio compression module, an image inputting unit, an image compression module, and a multiplexing module on a transmitting side, and a demultiplexing module, an audio expansion module, an image expansion module, an audio outputting unit and an image outputting unit on a receiving side, an image processing numerical value specifying module modifies arithmetic coefficients for processing expanded image data, expanded by the image expansion module. A processing switching module transmits expanded audio data and expanded image data to the audio outputting unit and the image outputting unit, respectively, in a first state, and also transmits the expanded audio data and the expanded image data to the audio compression module and the image compression module, respectively, in a second state. In the latter cases the expanded image data is transmitted via the image processing numerical value specifying module to the image compression module.

Also an audio processing numerical value specifying module for modifying arithmetic coefficients for processing the expanded audio data is provided. In this case, the expanded audio data is transmitted via the audio processing numerical value specifying module to the audio compression module.

Further, an echo canceller module for negatively-feeding the expanded audio data back to the audio compression module is provided to cancel an echo generated in the audio compression means when the image outputting unit is operated, and an echo canceller coefficient specifying module for modifying arithmetic coefficients for operations of the echo canceller module is provided. When the echo canceller module is operated the echo in the audio compression module is boosted.

BRIEF DESCRIPTION OF THE DRAWINGS

The present invention will be more clearly understood from the description as set forth below, as compared with the prior art, with reference to the accompanying drawings, wherein:

FIG. 9 is a block circuit diagram illustrating a second embodiment of the video telephone system according to the present invention;

FIG. 10 is a flowchart showing the operation of the video telephone system of FIG. 9;

FIGS. 11 and 12 are a diagrams showing audio frames used at step 1006 of FIG. 10;

FIG. 13 is a block circuit diagram illustrating a third embodiment of the video telephone system according to the present invention;

DESCRIPTION OF THE PREFERRED EMBODIMENTS

Before the description of the preferred embodiments, prior art video telephone systems will be explained with reference to FIGS. 1, 2, and 3.

Figure 1:
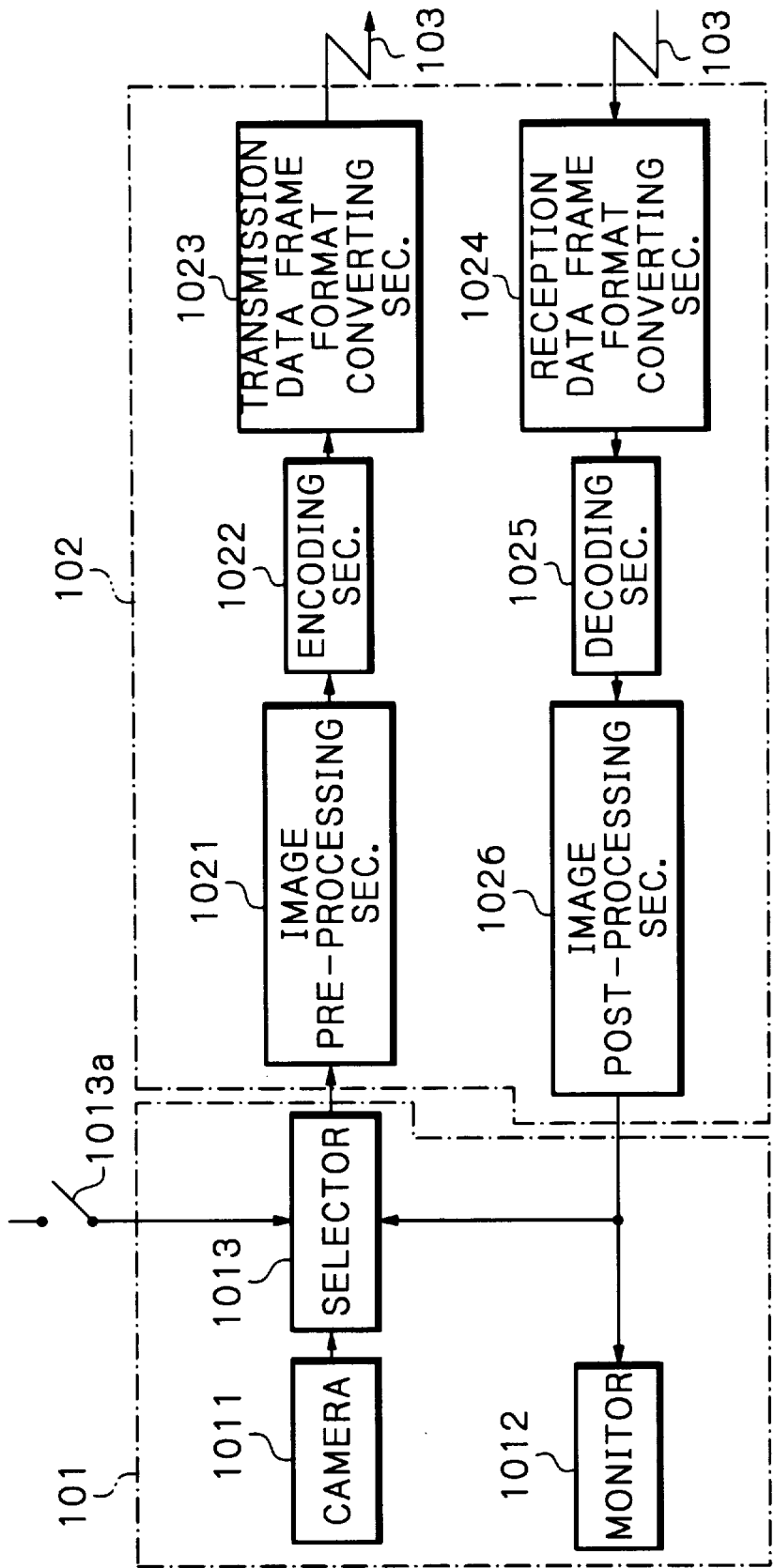
FIG. 1 is a block circuit diagram illustrating a first prior art video telephone system.

In FIG. 1, which illustrates a first prior art video telephone system (see: JP-A-1-295582), the video telephone system is designed to repel a mischievous call by sending back an image it receives from an end of a communication line to that end. That is, a video telephone set 101 is connected via a video codec 102 to a communication line 103.

The video telephone unit 101 is constructed by a video camera 1011 for shooting the speaker him- or herself and a monitor 1012, and a selector 1013 controlled by a selector switch (or button) 1013a.

Usually, the video codec 102 outputs a signal from the video camera 1011 to the communication 103 and also a signal from the communication line 103 to the monitor 1012. A similar video telephone set and a similar video codec are found at the other end of the communication line 103.

The video codec 102 is constructed by an image pre-processing section 1021, an encoding section 1022 and a transmission data frame format converting section 1023 connected in series, to output a signal from the video telephone set 101 to the communication line 103. Also, the video codec 102 is constructed by a reception data frame format converting section 1024, a decoding section 1025 and an image post-processing section 1026 connected in series, to lead a signal from the communication line 103 to the video telephone set 101.

Usually, the video signal of the image of the speaker him- or herself obtained by means of the video camera 1011 passes the selector 1013 before it is subjected to a predetermined operation of processing it for data conversion performed by the image pre-processing section 1021, the encoding section 1022 and the transmission data frame format converting section 1023 and subsequently output to the monitor at the other end of the communication line 103.

On the other hand, a signal transmitted to the video telephone set 101 through the communication line 103 is subjected to a predetermined operation of processing it for data conversion performed by the reception data frame format converting section 1024, the decoding section 1025 and the image post-processing section 1026 and subsequently input to the monitor 1012 of the video telephone set 101 to display an image of the speaker at the other end of the communication line 103.

The selector 1013 selects either the signal representing the shot image of the speaker him- or herself or that of the person at the other end of the communication line 103 and inputs it to the transmission means of the video telephone set 101. That is, if the call is a mischievous call, the speaker can turn ON the selector switch 1013a to select the signal of the image of the mischievous caller taken out of the image post-processing section 1026 and input it to the image pre-processing section 1021 in place of the signal for the image of the speaker him- or herself. As a result, the image of the mischievous caller is transmitted back to the other end of the communication line 103 to repel the mischievous call.

However, since the video telephone system of FIG. 1 simply sends back the image and the voice of the mischievous caller it receives from the other end of the communication line 103, the effect of repelling the mischievous call and preventing any possible second mischievous call is doubtful.

More specifically, since the mischievous caller can selectively see their own image on the monitor, the net effect of sending back the image of the mischievous caller can be that the latter sees more than their own images and that the mischievous caller can realize how he or she appears to the called. Thus, the effect of repelling the mischievous call will not be very remarkable.

Figure 2:
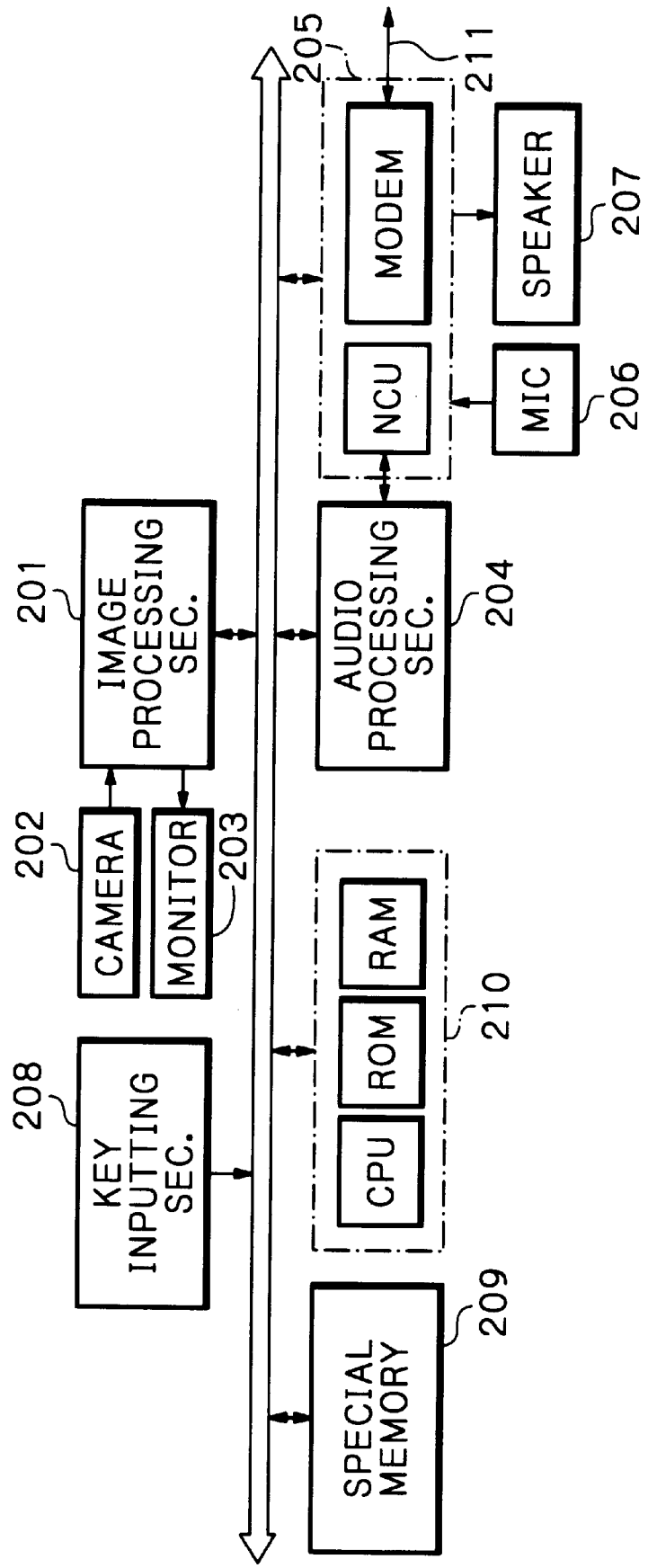
FIG. 2 is a block circuit diagram illustrating a second prior art video telephone system.

In FIG. 2, which illustrates a second prior art video telephone system (see: JP-A-6-303314), a counterattack message is transmitted to the mischievous caller. In FIG. 2, reference numeral 201 designates an image processing section connected to a camera 202 and a monitor 203. Also, reference numeral 204 designates an audio processing section connected to a modulator/demodulator section 205 which is also connected to a microphone 206 and a speaker 207. Further, reference numeral 208 designates a key inputting section having ten keypad and special key switches. In addition, reference numeral 209 designates a special memory for storing special images, special letters or the like. The entire video telephone system of FIG. 2 is controlled by a control circuit 210 which is constructed by a central processing unit (CPU), a read only memory (ROM) for storing programs, a random access memory (RAM) and the like. Reference numeral 211 designates a communication line.

Figure 3:
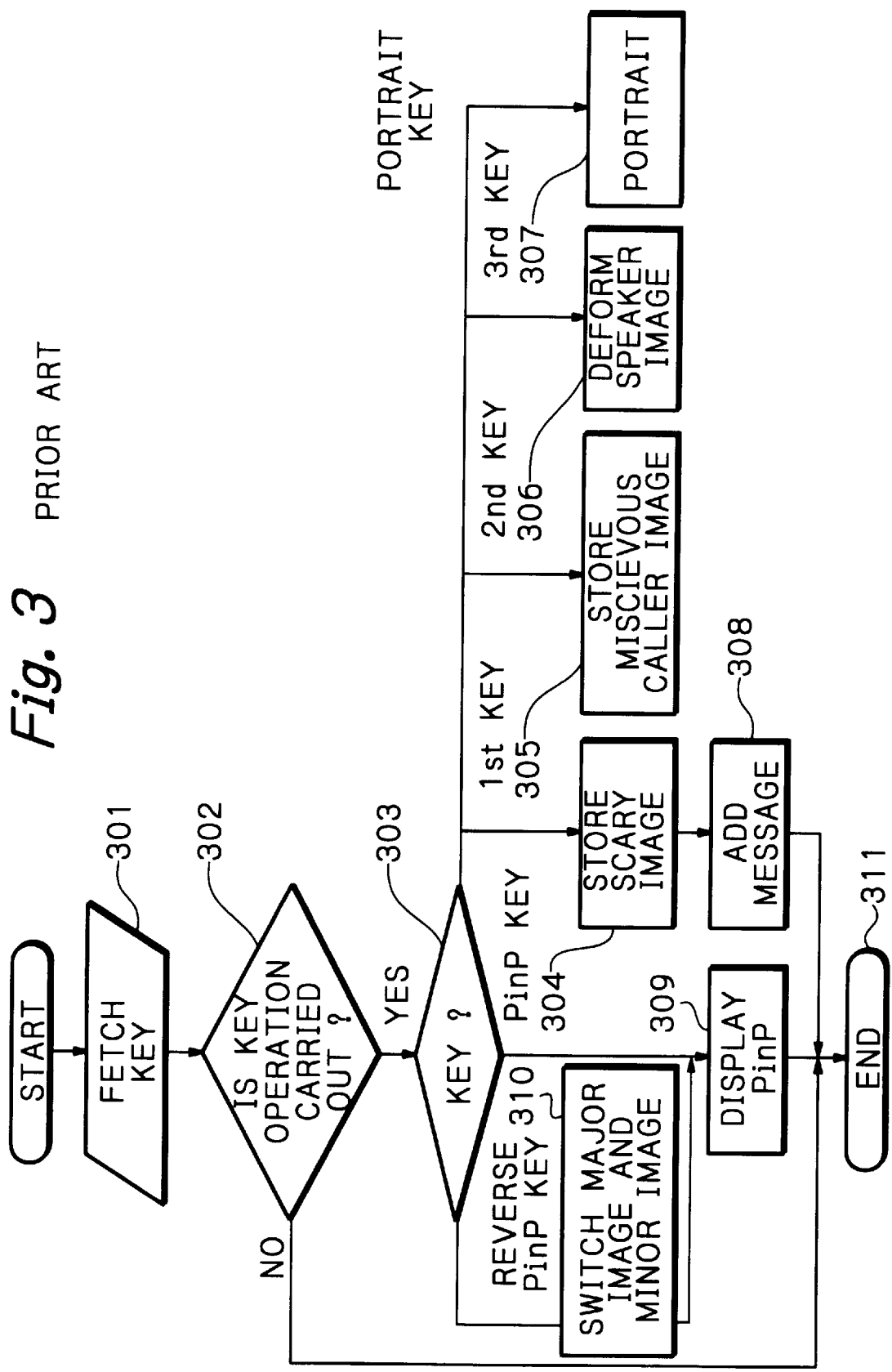
FIG. 3 is a flowchart showing the operation of the video telephone system of FIG. 2.

The operation of the video telephone system of FIG. 2, i.e., the operation of the control circuit 210 is explained nest with reference to FIG. 3.

First, at step 301, the control circuit 210 fetches key information from the key inputting section 208. Then, at step 302, it is determined whether or not a key operation is carried out. As a result, when a key operation is carried out, the control proceeds to step 303. Otherwise, the control proceeds directly to step 311.

At step 303, it is determined what key has been operated.

At step 303, if it is determined that a first repelling key has been operated, the control proceeds to step 304 which reads out a scary image of a man's face stored in the special memory 209 and stores it in a video memory of the image processing section 201.

At step 303, if it is determined that a second repelling key has been operated, the control proceeds to step 305 which stores the image of the mischievous caller sent from the other end of the communication line 211 in the video memory of the image processing section 201.

At step 303, if it is determined that a third repelling key has been operated, the control proceeds to step 306 which performs an image processing operation of deforming the image of the speaker him- herself taken by the camera 202.

At step 303, if it is determined that a portrait key has been operated, the control proceeds to step 307 which stores a portrait of the speaker him-or herself from the special memory 209 in the video memory of the image processing section 201.

When the operation at step 304, 305, 306 or 307 is over, the control proceeds to step 308 subsequently operates to add a message for repelling the mischievous call to a selected image. Such a message is "None of your nonsense" or "The police will be called right away".

Thereafter, the image data and the character data stored in the video memory are compressed and encoded by means of a main routine (not shown) to transmit the image and the message to the other end of the communication line 211. As a result, the mischievous caller will see a scary image of a man's face, an image of the mischievous caller that has been temporarily stored or a deformed image or a portrait of the speaker, whichever is selected, along with the message selected to counter the mischievous caller on the monitor 203, so that the mischievous call will successfully be repelled.

Additionally, at step 303, if it is determined that a picture-in picture pin (PinP) key has been operated, the control proceeds to step 309 which carries out a PinP processing operation of displaying an image of the speaker as a minor image and an image of the caller as a major image on the screen will be performed. Also, at step 303, if it is determined that a reverse PinP key has been operated, the control proceeds to step 310 which switches the major image and the minor image, and the control proceeds to step 309. In this case, a reverse PinP processing operation is carried out.

However, since the video telephone system is provided with a novel processing means, for generating data (image data and character data) that can produce a remarkable effect on the mischievous caller, this video telephone system is accompanied by an additional load.

Figure 4:
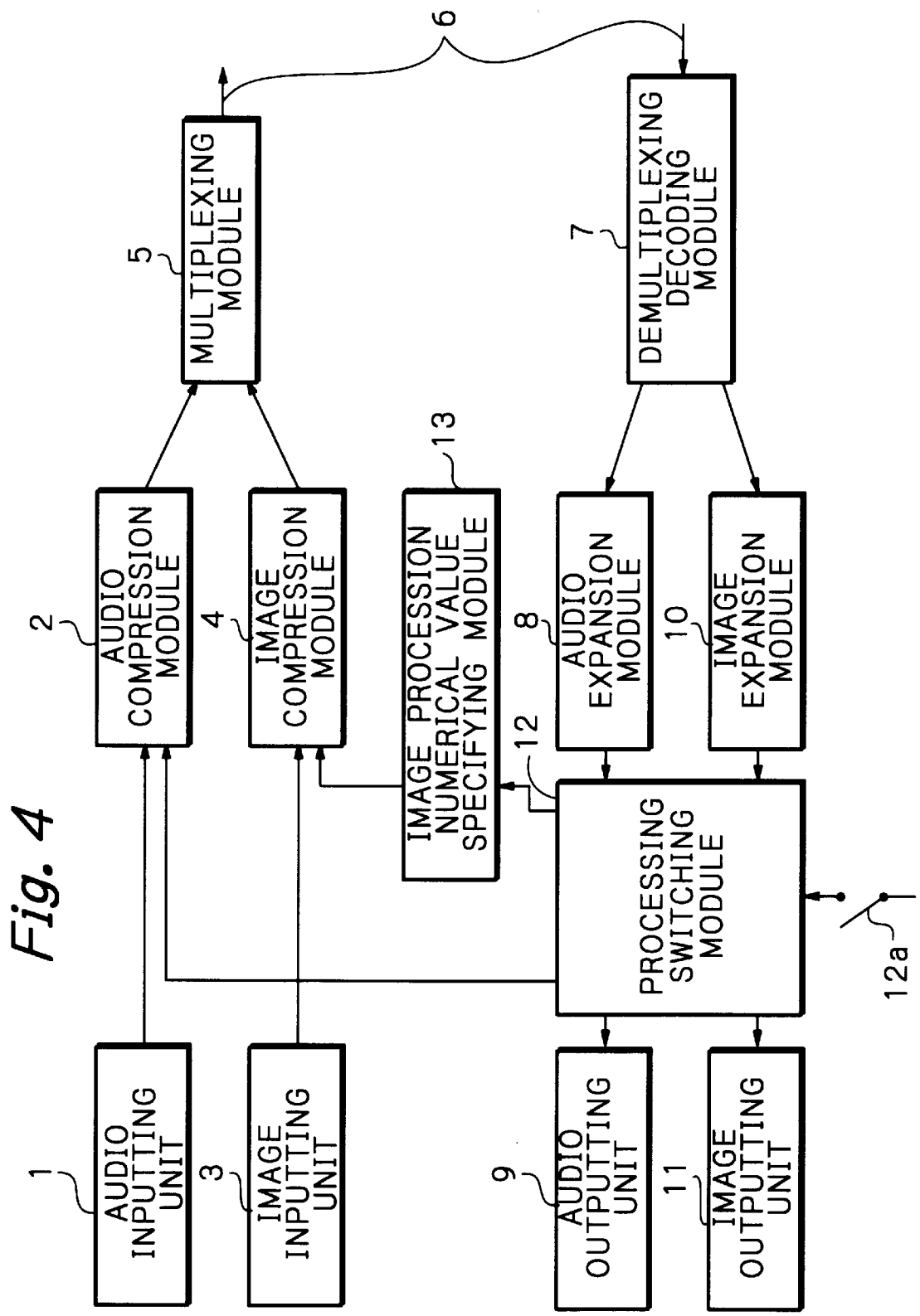
FIG. 4 is a block circuit diagram illustrating a first embodiment of the video telephone system according to the present invention.

In FIG. 4, which illustrates a first embodiment of the video telephone system according to the present invention, an audio inputting unit 1 such as a microphone is connected to an audio compression module 2, and an image inputting unit 3 such as a camera is connected to an image compression module 4. The audio compression module 2 and the image compression module 4 are connected to a multiplexing module 5 which is connected to a communication line (Telephone line) 6.

On the other hand, the communication line 6 is connected to a demultiplexing module 7 the demultiplexing module 7 is connected to an audio expansion module 8 which is also connected to an audio outputting unit 9 such as a loudspeaker. Further, the demultiplexing module 7 is connected to an image expansion module 10 which is also connected to an image outputting unit 11 such as a monitor screen.

Provided between the expansion modules 8 and 10 and the outputting units 9 and 11 is a processing switching module 12 which is connected to the audio compression module 2 and via an image processing numerical value specifying module 13 to the image compression module 4. That is, when a mischievous call repelling key 12a is turned OFF, the processing switching module 12 is operated so that the audio expansion module 8 and the image expansion module 10 are connected to the audio outputting unit 9 and the image outputting unit 11, respectively. On the other hand, when the mischievous call repelling key 12a is turned ON, the processing switching module 12 is operated so that the audio expansion module 8 and the image expansion module 10 are connected to the audio compression module 2 and the image compression module 4 via the image processing numerical value specifying module 13, respectively.

Figure 5:
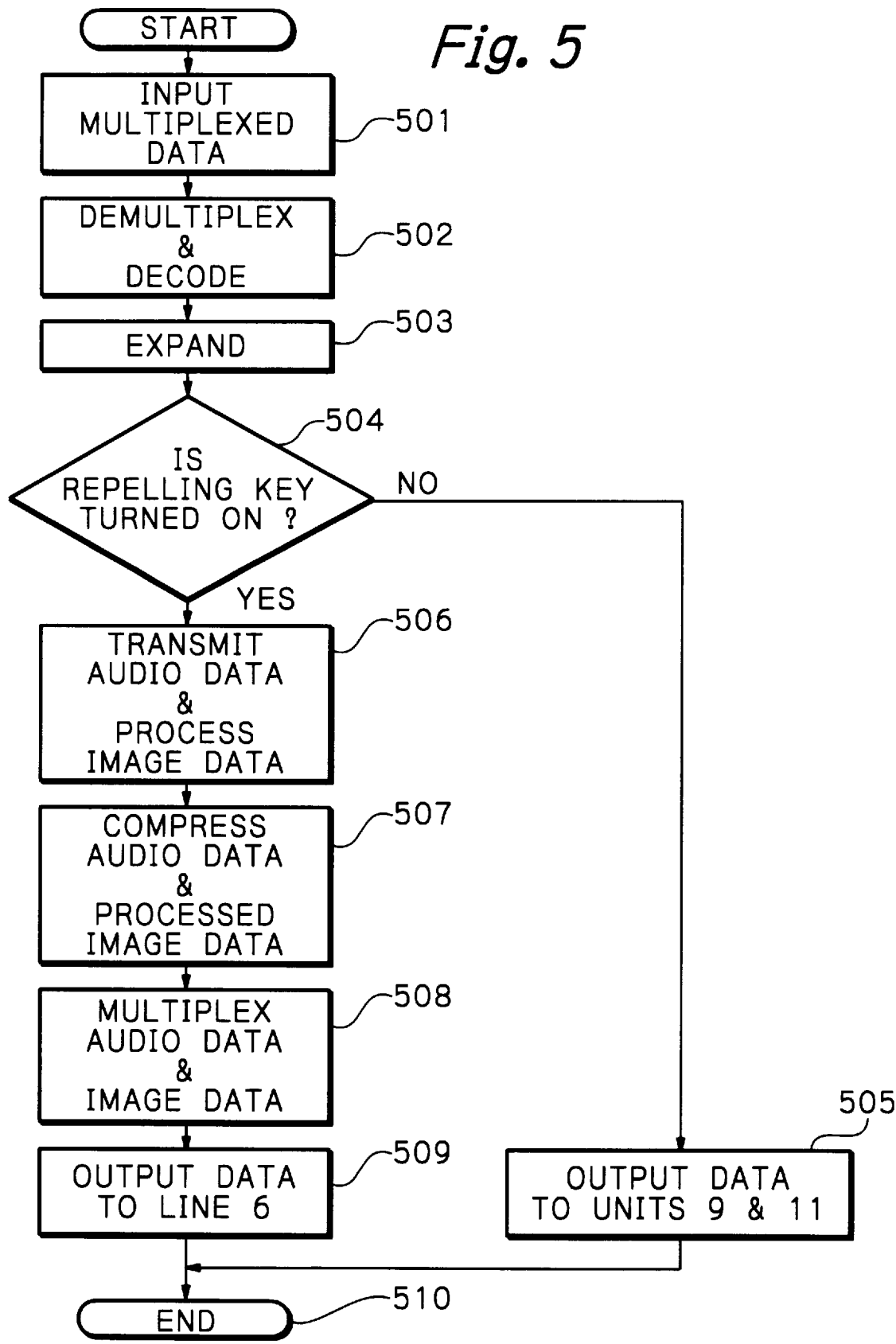
FIGS. 5 and 6 are flowcharts showing the operation of the video telephone system of FIG. 4.

The operation of the video telephone system of FIG. 4 is explained next with reference to FIG. 5. Note that FIG. 5 shows the operation of a reception side of the video telephone system of FIG. 4.

First, at step 501, multiplexed data for the audio and image of a caller is input from the communication line 6 to the demultiplexing/decoding module 7.

Next, at step 502, the demultiplexing/decoding module 7 demultiplexes and decodes the multiplexed data to generate an audio data and an image data.

Next, at step 503, the audio data is fed to the audio expansion module 8, where it is processed for expansion to restore the original audio data in terms of time length, whereas the video data is fed to the image expansion module 10, where it is processed for expansion to restore the original image data in terms of time length.

Next, at step 504, the processing switching module 12 determines whether or not the mischievous call repelling key 12a is turned ON.

The mischievous call repelling key 12a is normally OFF; however, the key 12a is turned ON only when a mischievous call repelling processing mode is selected by the user.

When the mischievous call repelling key 12a is turned OFF, the control proceeds from step 504 to step 505, so that the processing switching module 12 feeds the expanded audio data from the audio expansion module 8 to the audio outputting unit 9 to output the audio. At the same time, the processing switching module 12 feeds the expanded image data from the image expansion module 10 to the image outputting unit 11 to output the image. Thus, the callers image is displayed on the monitor screen of the image outputting unit 11 and the caller's voice sounds through the loudspeaker of the audio outputting unit 9.

On the other hand, when the mischievous call repelling key 12a is turned ON, the control proceeds from step 504 to step 506, so that the processing switching module 12 feeds the expanded audio data from the audio expansion module 8 to the audio compression module 2. At the same time, the processing switching module 12 feeds the expanded image data from the image expansion module 10 to the image processing numerical value specifying module 13 which processes the image data and turns the caller's image into an ugly one that can scare the caller by using the image compression module 4.

At step 507, the processed image data is compressed by the image compression module 4, so that it is turned into a coded and compressed image data representing an ugly image of the caller that can even scare the caller. Meanwhile, the audio data expanded by the audio expansion module 8 fed to the audio compression module 2 is processed for compression.

Next, at step 508, the compressed and coded audio data and the compressed and coded image data are multiplexed by the multiplexing module 5.

Next, at step 509, the multiplexed data is output to the mischievous caller at the other end of the communication line 6.

Then, the routine of FIG. 5 is completed by step 510.

In FIGS. 4 and 5, if the mischievous call repelling key 12a is ON, the supply of the audio data to the audio outputting unit 9 is blocked by the processing switching module 12 and the supply of the image data to the image outputting unit 11 is also blocked by the processing switching module 12, so that neither audio nor image will be reproduced.

The operation of the image processing numerical value specifying module 13 of FIG. 4 is explained next with reference to FIG. 6.

First, at step 601, the image data of an original image is input to the image compression module 4.

Figure 7:
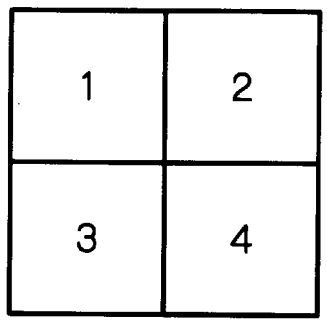
FIG. 7 is a diagram showing a block division at step 602 of FIG. 6.

Next, at step 602, the input original image is divided into a number of blocks. For example, the input original image is divided into 2×2 pixel blocks (vertically 2 pixels and horizontally 2 pixels), which are numbered as 1, 2, 3 and 4 respectively, as shown in FIG. 7.

Next, at step 603, the original image that has been divided into blocks is subjected to an operation of frequency conversion on a block by block basis.

Next, at step 604, a processing operation of quantization typically involving divisions is carried out by using a quantization coefficient.

Next, at step 605, a variable-length coding operation is carried out.

Figure 6:
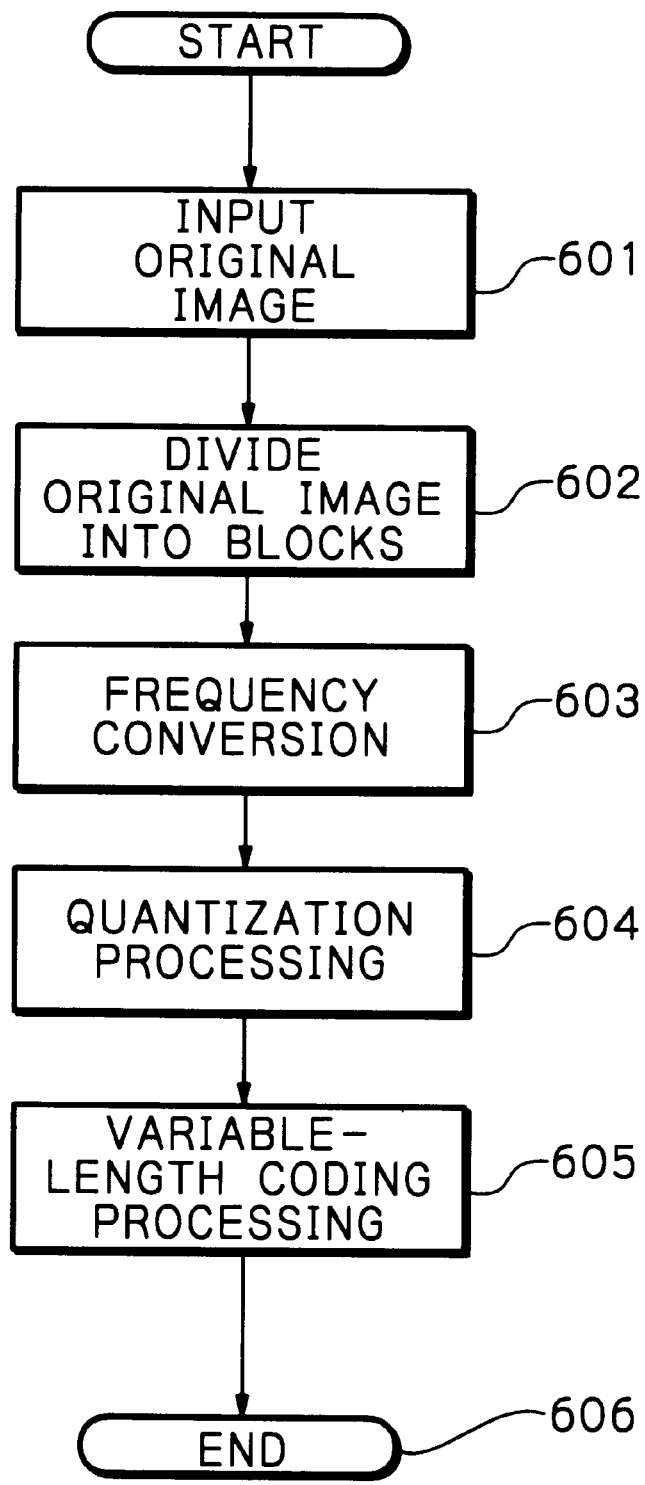

Then the routine of FIG. 6 is completed by step 606.

Figure 8:
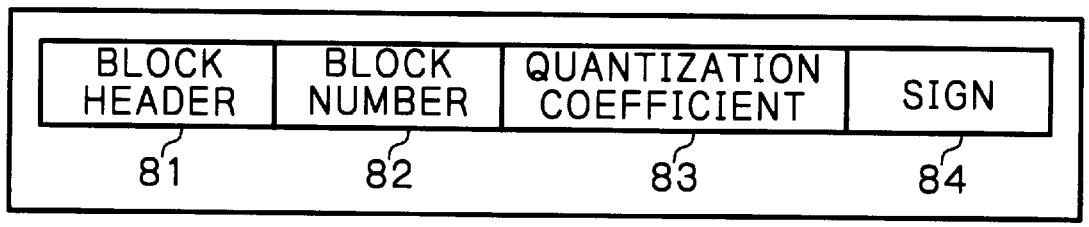
FIG. 8 is a diagram showing an encoded block data at step 605 of FIG. 6.

Thus, by the above series of processing operations of FIG. 6, a code string data is produced for each block as indicated in FIG. 8.

As seen from FIG. 8, the code string data (block data) of each block comprises a block header 61 describing the start symbol of the block data and the block length, a block number 82 assigned to it when the original image is divided into blocks at step 602 of FIG. 6, a quantization coefficient 83 used in the processing operation of quantization at step 604 of FIG. 6 and a sign 34 for the image data obtained by the coding operation at step 605 of FIG. 6. Note that the block data as shown in FIG. 8 is a block data for the image to be expanded by the image expansion module 10.

When the image expansion module 10 receives a block data for the caller's image as data for a mischievous call, the processing switching module 12 issues a command to the image processing numerical value specifying module 13, specifying a modification to the quantization coefficient 83 of the input data and/or switching some or all of the block numbers 82.

Assume here that a command for switching "1" to "3", "2" to "4", "4" to "2" and "3" to "1" for the input block numbers 82 is issued. Then, when an image is divided into 2×2 blocks as shown in FIG. 7, an image data representing an image obtained by replacing the upper two blocks and the lower two blocks by each other will be produced by the image compression module 44. When the quantization coefficient 83 is modified to a value effective to produce a coarse image, an image data representing an image obtained by blurring the contour of the caller will be produced by the image compression module 4.

With the above described scheme for sending back processed image-data to the other end of the communication line 6, when the mischievous call repelling image processing mode is selected by the user, the user can transmit an indiscernible image of the mischievous caller obtained typically by turning upside down, laterally reversing and/or blurring the original image back to the mischievous caller along with the voice of the mischievous caller without seeing and/or hearing the image and/or audio data received from the mischievous caller. As a result, the mischievous caller is forced to hear their own voice and see a processed ugly image, for which the mischievous caller will be charged, so that the mischievous caller will be discouraged to make any further mischievous call. In other words, a mischievous call can be effectively repelled, and any possible mischievous call can be prevented from taking place.

In FIG. 9, which illustrates a second embodiment of the video telephone system according to the present invention, an audio processing numerical value specifying module 14 is provided instead of the image processing numerical value specifying module 13 of FIG. 4.

The operation of the video telephone system of FIG. 9 is explained next with reference to FIG. 10. Note that FIG. 10 shows the operation of a reception side of the video telephone system of FIG. 9.

First, at step 1001, multiplexed data for the audio and image of a caller is input from the communication line 6 to the demultiplexing/decoding module 7.

Next, at step 1002, the demultiplexing/decoding module 7 demultiplexes and decodes the multiplexed data to generate an audio data and an image data.

Next, at step 1003, the audio data is fed to the audio expansion module 8, where it is processed for expansion to restore the original audio data in terms of time length, whereas the video data is fed to the image expansion module 10, where it is processed for expansion to restore the original image data in terms of time length.

Next, at step 1004, the processing switching module 12 determines whether or not the mischievous call repelling key 12a is turned ON.

When the mischievous call repelling key 12a is turned OFF, the control proceeds from step 1004 to step 1005, so that the processing switching module 12 feeds the expanded audio data from the audio expansion module 8 to the audio outputting unit 9 to output the audio. At the same time, the processing switching module 12 feeds the expanded video data from the image expansion module 10 to the image outputting unit 11 to output the image. Thus, the caller's image is displayed on the monitor screen of the image outputting unit 11 and the caller's voice sounds through the loudspeaker of the audio outputting unit 9.

On the other hand, when the mischievous call repelling key 12a is turned ON, the control proceeds from step 1004 to step 1006, so that the processing switching module 12 feeds the expanded image data from the image expansion module 10 to the image compression module 4. At the same time, the processing switching module 12 feeds the expanded audio data from the audio expansion module 8 to the audio processing numerical value specifying module 14 which processes the audio data and turns the caller's audio into a harsh voice that is very unpleasant to the caller by using the audio compression module 2.

At step 1007, the processed audio data is compressed by the audio compression module 2, so that it is turned into an coded and compressed audio data representing a harsh voice of the caller that can even scare the caller. Meanwhile, the image data expanded by the image expansion module 10 fed to the image compression module 4 is processed for compression.

Next, at step 1008, the compressed and coded audio data and the compressed and coded image data are multiplexed by the multiplexing module 5.

Next, at step 1009, the multiplexed data is output to the mischievous caller at the other end of the communication line 6.

Then, the routine of FIG. 10 is completed by step 1010.

Now, an example of a specification that can be produced by the audio processing numerical value specifying module 14 will be described by referring to FIG. 11, illustrating the audio frames expanded and output from the audio expansion module 8, and FIG. 12, illustrating the frames obtained by processing the data in each frame in terms of the order of data arrangement by means of the speech processing numerical value specifying module 14.

Referring to FIGS. 9, the audio frames expanded by the audio expansion module 8 and output to the audio outputting unit 9 include a total of N frames numbered as frame 1 through frame N, which contain headers 1101-1 through 1101-N and audio data 1102-1 through 1102-N, respectively. The frames are arranged in a time sequential fashion and output to the audio outputting unit 9.

When the received call is a mischievous call and the user turns ON the mischievous call repelling key 12a, the destination of the audio frames expanded by the audio expansion module 8 and output to the audio outputting unit 9 are switched from the audio outputting unit 9 to the audio processing numerical value specifying module 14, which by turn issues a command, specifying a rearrangement of the data in the audio frames according to the specified numerical value.

Assume here that the rearrangement numerical value is a one that rearranges the data reversibly. Then, the data of the first frame is reversibly arranged to become data 1202-1, the data of the second frame is reversibly arranged to become data 1202-1 and so on as shown in FIG. 12. Thus, the data of the N-th frame is reversibly arranged to become data 1202-N, as shown in FIG. 12. Subsequently, the reversed data of the frames is taken out of the audio processing numerical value specifying module 14 and delivered to the audio compression module 2.

The audio frames containing reversibly rearranged data are then subjected to a compressing operation by the audio compression module 2 and the data is multiplexed with the image data from the image compression module 4 by the multiplexing module 5 before it is sent to the caller. If the-frames are long, the syllables of the audio data are interchanged randomly to make it sound like total nonsense. If, on the other hand, the frames are short, the original audio data will be interrupted very frequently before it is sent back to the caller as harsh speech.

Thus, in FIG. 9, when the mischievous call repelling key 12a is turned ON by the user, the user can transmit a harsh audio obtained by processing the original audio data of the mischievous caller with syllables interchanged randomly or interrupted very frequently without seeing and/or hearing the image and/or audio data received from the caller. As a result, the mischievous caller is forced to hear a harsh voice produced by deforming the original voice of the mischievous caller, and to see their own image, for which the mischievous caller will be charged, so that the mischievous caller will be discouraged to make a mischievous call any further. In other words, a mischievous call can be effectively repelled, and any possible mischievous call can be prevented from taking place.

In FIG. 13, which illustrates a third embodiment of the video telephone system according to the present invention, an echo canceller coefficient specifying module 15, an echo canceller 16 and a subtracter 16 are provided instead of the audio processing numerical value specifying module 14 of FIG. 9.

Figure 14:
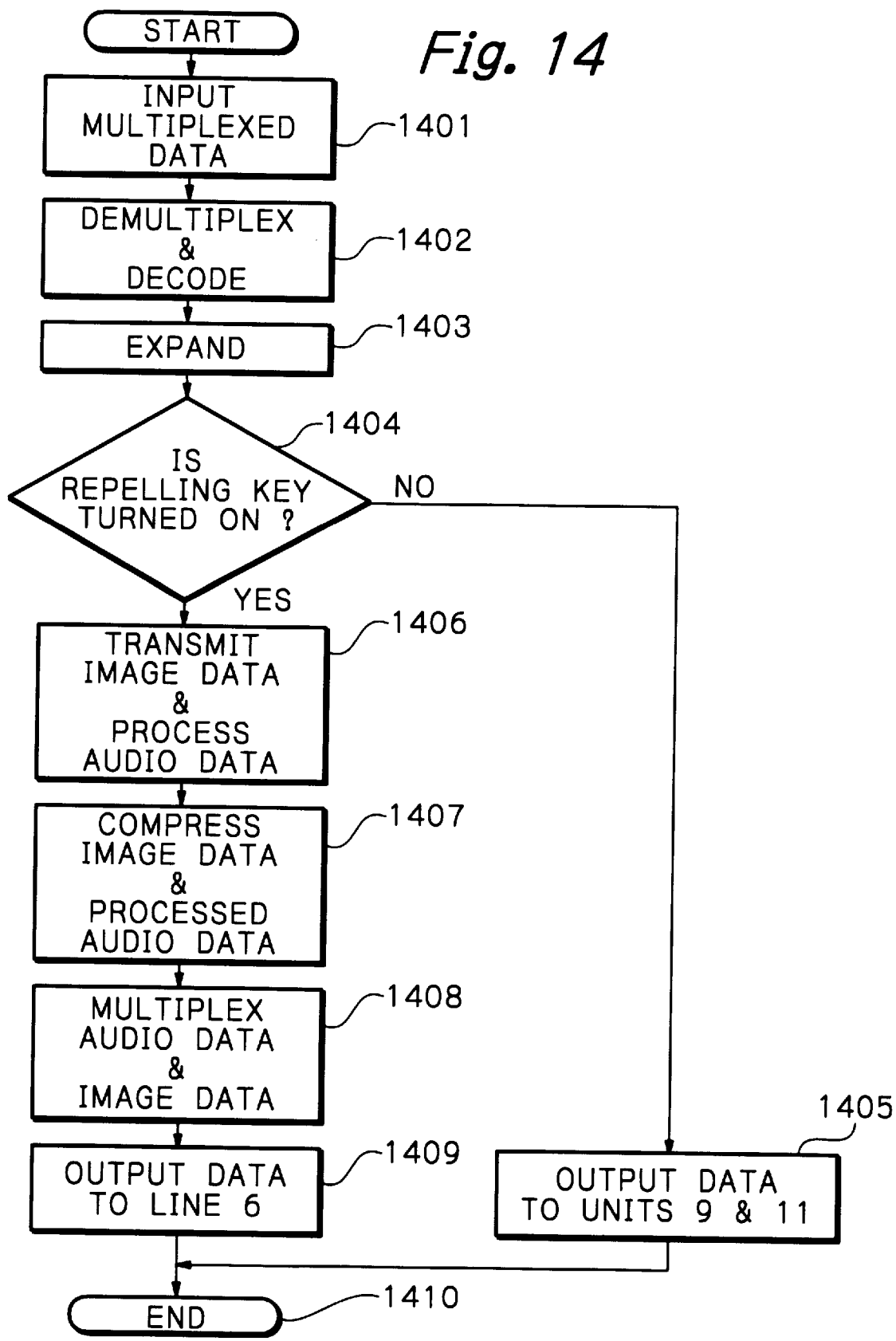
FIG. 14 a flowchart showing the operation of the video telephone system of FIG. 12.

The operation of the video telephone system of FIG. 13 is explained next with reference to FIG. 14. Note that FIG. 14 shows the operation of a reception side of the video telephone system of FIG. 13.

First, at step 1401, multiplexed data for the audio and image of a caller is input from the communication line 6 tot he demultiplexing/decoding module 7.

Next, at step 1402, the demultiplexing/decoding module 7 demultiplexes and decodes the multiplexed data to generate an audio data and an image data.

Next, at step 1403, the audio data is fed to the audio expansion module 8, where it is processed for expansion to restore the original audio data in terms of time length, whereas the video data is fed to the image expansion module 10, where it is processed for expansion to restore the original image data in terms of time length.

Next, at step 1404, the processing switching module 12 determines whether or not the mischievous call repelling key 12a is turned ON.

When the mischievous call repelling key 12a is turned OFF, the control proceeds from step 1404 to step 1405, so that the processing switching module 12 feeds the expanded audio data from the audio expansion module 8 to the audio outputting unit 9 to output the audio. At the same time, the processing switching module 12 feeds the expanded video data from the image expansion module 10 to the image outputting unit 11 to output the image. Thus, the caller's image is displayed on the monitor screen of the image outputting unit 11 and the caller's voice sounds through the loudspeaker of the audio outputting unit 9.

On the other hand, when the mischievous call repelling key 12a is turned ON, the control proceeds from step 1404 to step 1406, so that the processing switching module 12 feeds the expanded image data from the image expansion module 10 to the image compression module 4. At the same time, the processing switching module 12 feeds the expanded audio data from the audio expansion module 8 to the echo canceller coefficient specifying module 15. As a result, the coefficients in the echo canceller 16 are processed. The processed audio data obtained as a result of the operation of the echo canceller 16 for processing the coefficients is then turned into an audio data whose echo has been cancelled by subtracting it from the audio data sent from the audio inputting unit 1 by the subtracter 17.

At step 1407, the processed audio data is compressed by the audio compression module 2, so that it is turned into a coded and compressed audio data representing a harsh voice of the caller that can even scare the caller. Meanwhile, the image data expanded by the image expansion module 10 fed to the image compression module 4 is processed for compression.

Next, at step 1408, the compressed and coded audio data and the compressed and coded image data are multiplexed by the multiplexing module 5.

Next, at step 1409, the multiplexed data is output to the mischievous caller at the other end of the communication line 6.

Then, the routine of FIG. 14 is completed by step 1410.

An example of the operation of the echo canceler coefficient specifying module 15 for processing filter coefficients $h_0, h_1 \ldots h_n$ is explained next with reference to FIGS. 15 and 16.

Figure 15:
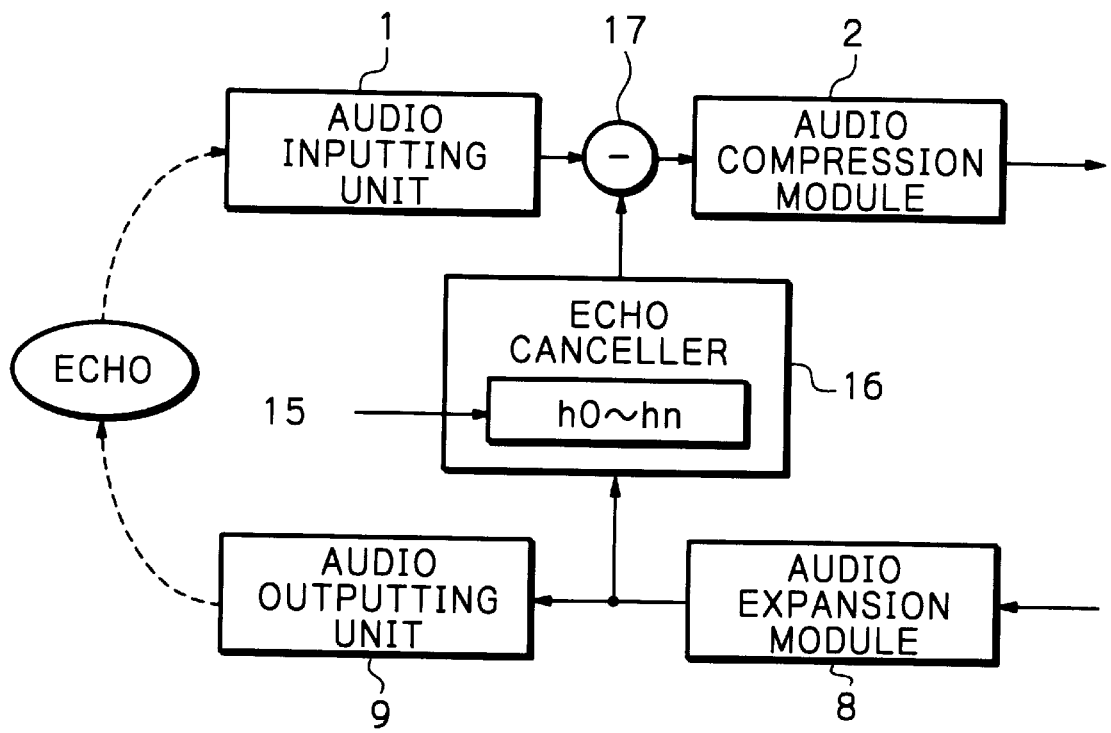
FIG. 15 is a partial circuit diagram of the video telephone system of FIG. 13.

In FIG. 15, which is a partial block circuit of the video telephone system of FIG. 13, the echo canceller 16 cancels an echo X that can be produced when the audio data that has been expanded by the audio expansion module 8 and then converted by and output from the audio outputting unit 9 is again entered to the audio inputting unit 1. The echo canceller 16 takes in the audio data that is output from the audio expansion module 8 to the audio outputting unit 1 and generates the same sound as a sound entering the audio inputting unit 1 as an echo through a calculation using the filter coefficients h0 to hn so that the echo X say be canceled by subtracting the generated sound from the audio data input from the audio inputting unit 1. In this case, the filter coefficients h0 to hn have to be adjusted appropriately by taking the volume of a room where the video telephone system of FIG. 13 is located and the positional relationship between the microphone of the audio inputting unit 1 and the loudspeaker of the audio outputting unit 9 being used by the user.

Figure 16:
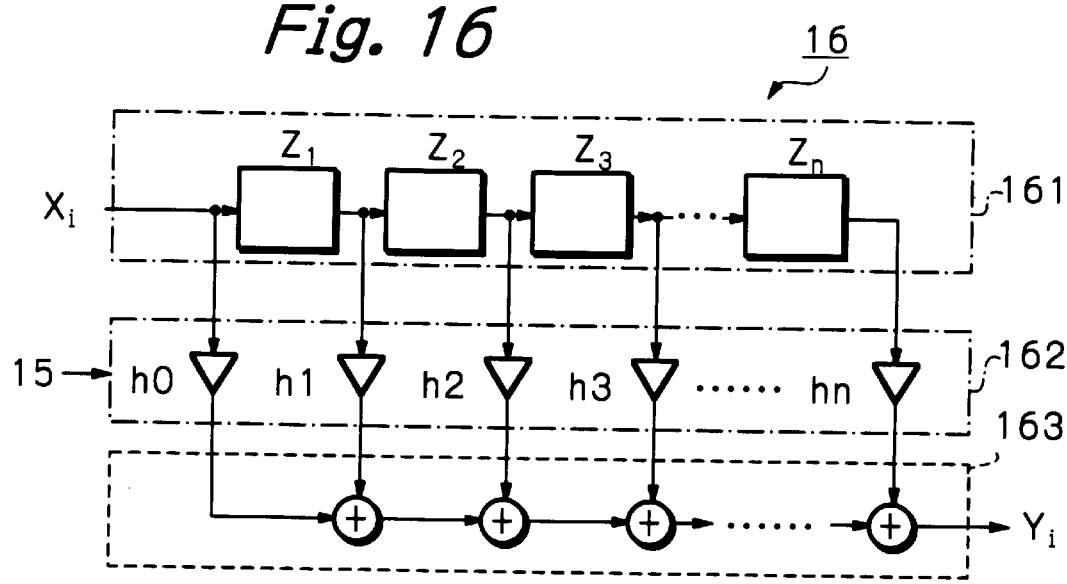
FIG. 16 is a detailed circuit diagram of the echo canceller of FIG. 15.

Further, referring to FIG. 16, which is a detailed circuit diagram of the echo canceller 16 of FIG. 15, the echo canceller 16 is constructed by a delay circuit 161 formed by delay elements $Z_1, Z_2, \ldots, Z_n$ connected in series for delaying data $X_i$ from the audio expansion module 8, a multiplier circuit 162 formed by (n+1) multipliers each for multiplying the data $X_1$ or data generated from the delay elements $Z_1, Z_2, \ldots Z_n$ with filter coefficients h0, h1, ..., hn, respectively, and an adder circuit formed by n adders for adding the outputs of the multiplier circuit 162 to generate an output $Y_i$.

In short, the echo canceller 16 will operate well when the filter coefficients h0 through hn are adjusted properly to reflect the conditions under which the user is using the video telephone system of FIG. 13.

In FIG. 13, when the echo canceller coefficient specifying module 15 is operated to randomly specify the filter coefficients h0 to hn that are intentionally selected for the echo canceller 16, the echo X is not cancelled but is boosted. That is the echo canceller 16 accentuates (boosts) an echo on the expanded audio data taken out of the audio expansion module 8 before delivering the audio data to the audio compression module 2, so that an audio data for a well echoed sound is multiplexed with a video data and transmitted back to the mischievous call at the other end of the communication line 6.

Thus, in FIG. 13, when the mischievous call repelling key 12a is turned ON by the user, the user can transmit an echoed harsh voice obtained by processing the original audio data of the mischievous caller without seeing and/or hearing the image and/or audio data received from the caller. As a result, the mischievous caller is forced to hear a harsh voice produced by echoing the original voice of the mischievous caller that sound like a voice spoken in a cave and see their own image, for which the mischievous caller will be charged, so that the mischievous caller will be discouraged to make a mischievous call any further. In other words, a mischievous call can be effectively repelled, and any possible mischievous call can be prevented from taking place.

Figure 17:
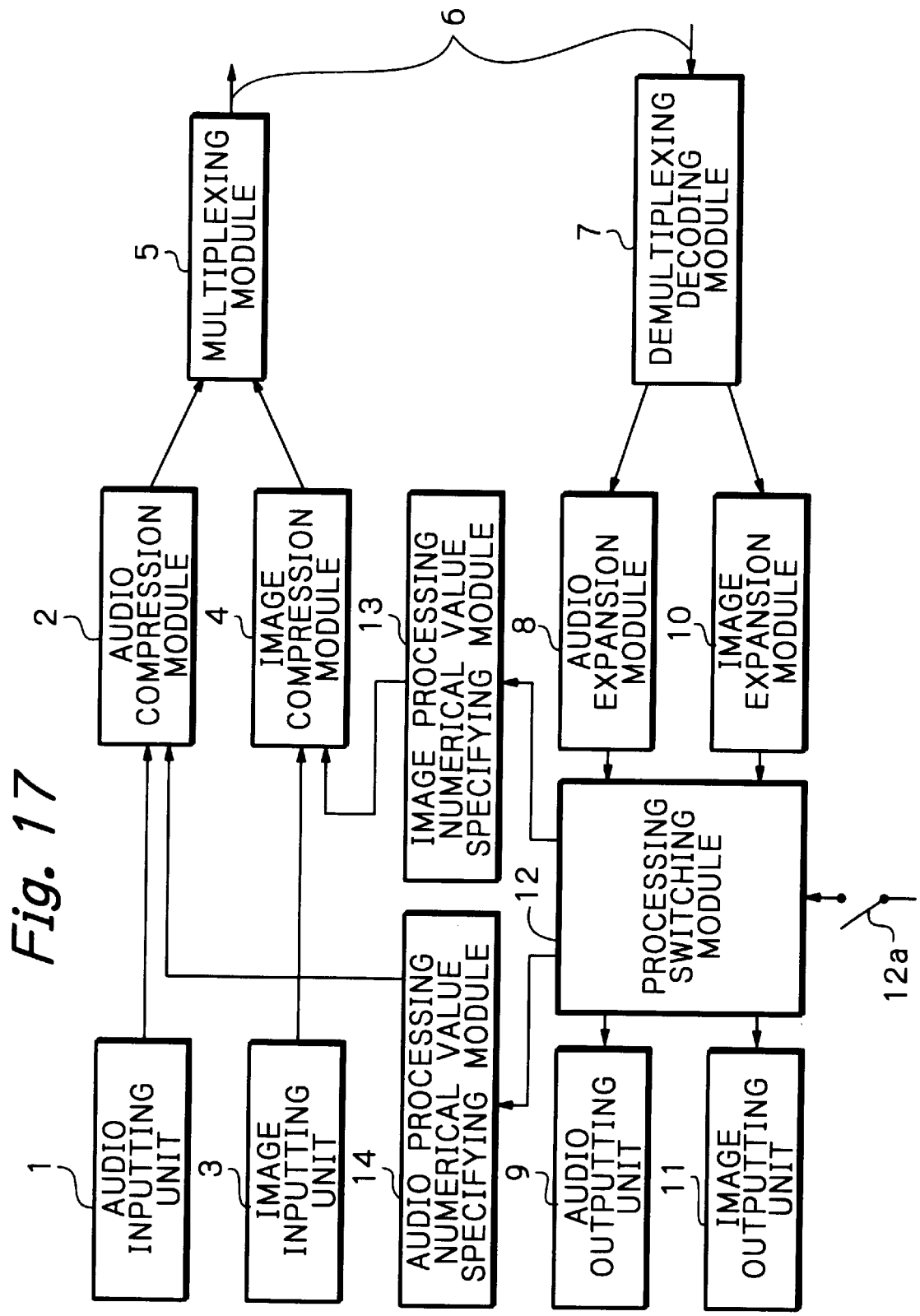
FIGS. 17, 18, 19 and 20 are block circuit diagrams illustrating fourth, fifth, sixth and seventh embodiments, respectively, of the video telephone system according to the present invention.

In FIG. 17, which illustrates a fourth embodiment of the video telephone system according to the present invention, the video telephone system of FIG. 4 is combined with that of FIG. 9. As a result, when the mischievous call repelling image processing mode is selected by the user, the user can transmit an indiscernible image of the mischievous caller obtained typically by turning upside down, laterally reversing and/or blurring the original image back to the mischievous caller along with a harsh voice obtained by processing the original audio data of the mischievous caller with syllables interchanged randomly or interrupted very frequently without seeing and/or hearing the image and/or audio data received from the mischievous callers As a result, the mischievous caller is forced to hear their own voice and see a processed ugly image, for which the mischievous caller will be charged, so that the mischievous caller will be discouraged to make a mischievous call any further. In other words, a mischievous call can be effectively repelled, and any possible mischievous call can be prevented from taking place.

Figure 18:
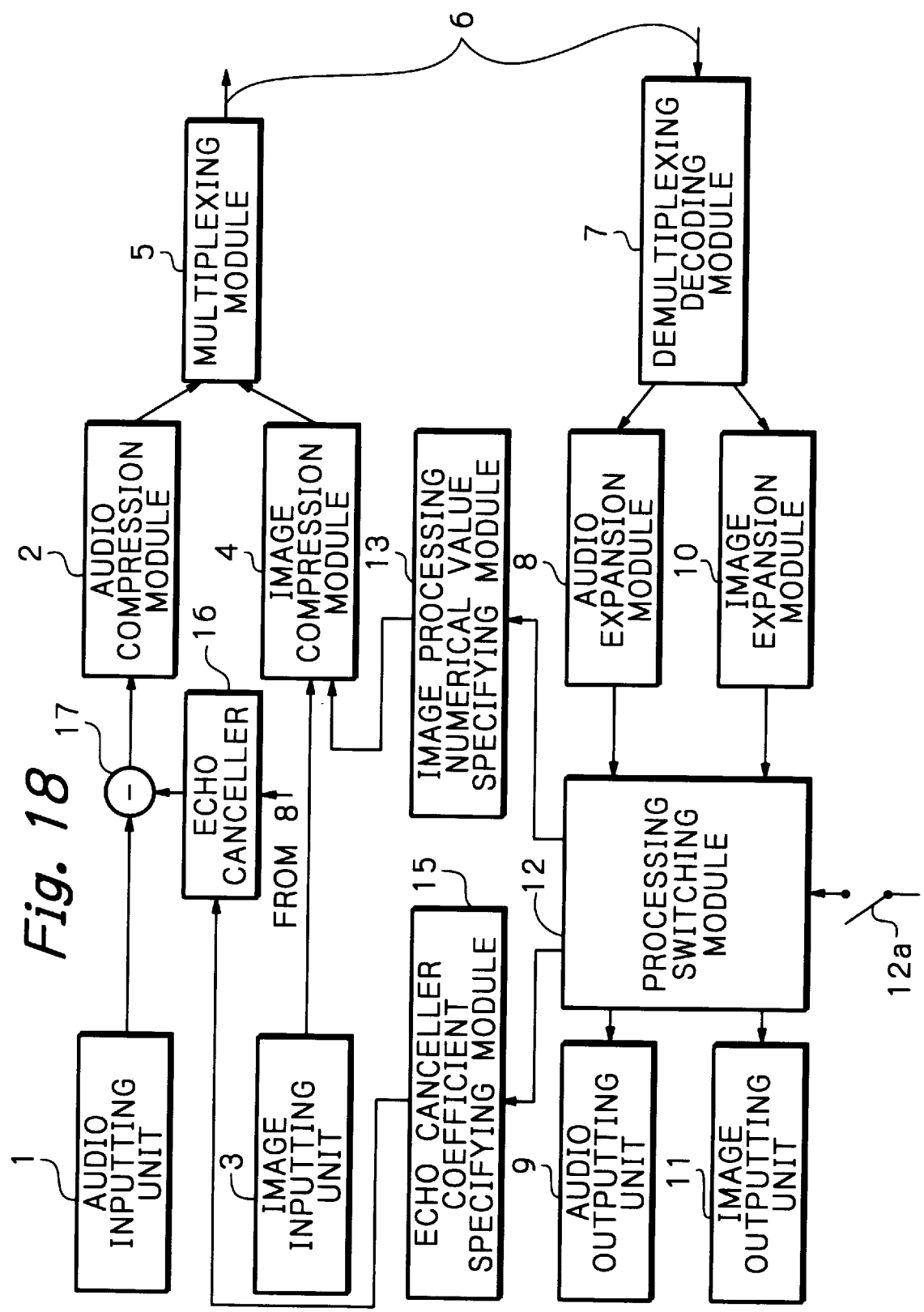

In FIG. 18, which illustrates a fifth embodiment of the video telephone system according to the present invention, the video telephone system of FIG. 4 is combined with that of FIG. 13. As a result, when the mischievous call repelling image processing mode is selected by the user, the user can transmit an indiscernible image of the mischievous caller obtained typically by turning upside down, laterally reversing and/or blurring the original image back to the mischievous caller along with an echoed harsh voice obtained by processing the original audio data of the mischievous caller without seeing and/or hearing the image and/or audio data received from the mischievous caller. As a result, the mischievous caller is forced to hear their own voice and see a processed ugly image, for which the mischievous caller will be charged, so that the mischievous caller will be discouraged to make a mischievous call any further. In other words, a mischievous call can be effectively repelled, and any possible mischievous call can be prevented from taking place.

Figure 19:
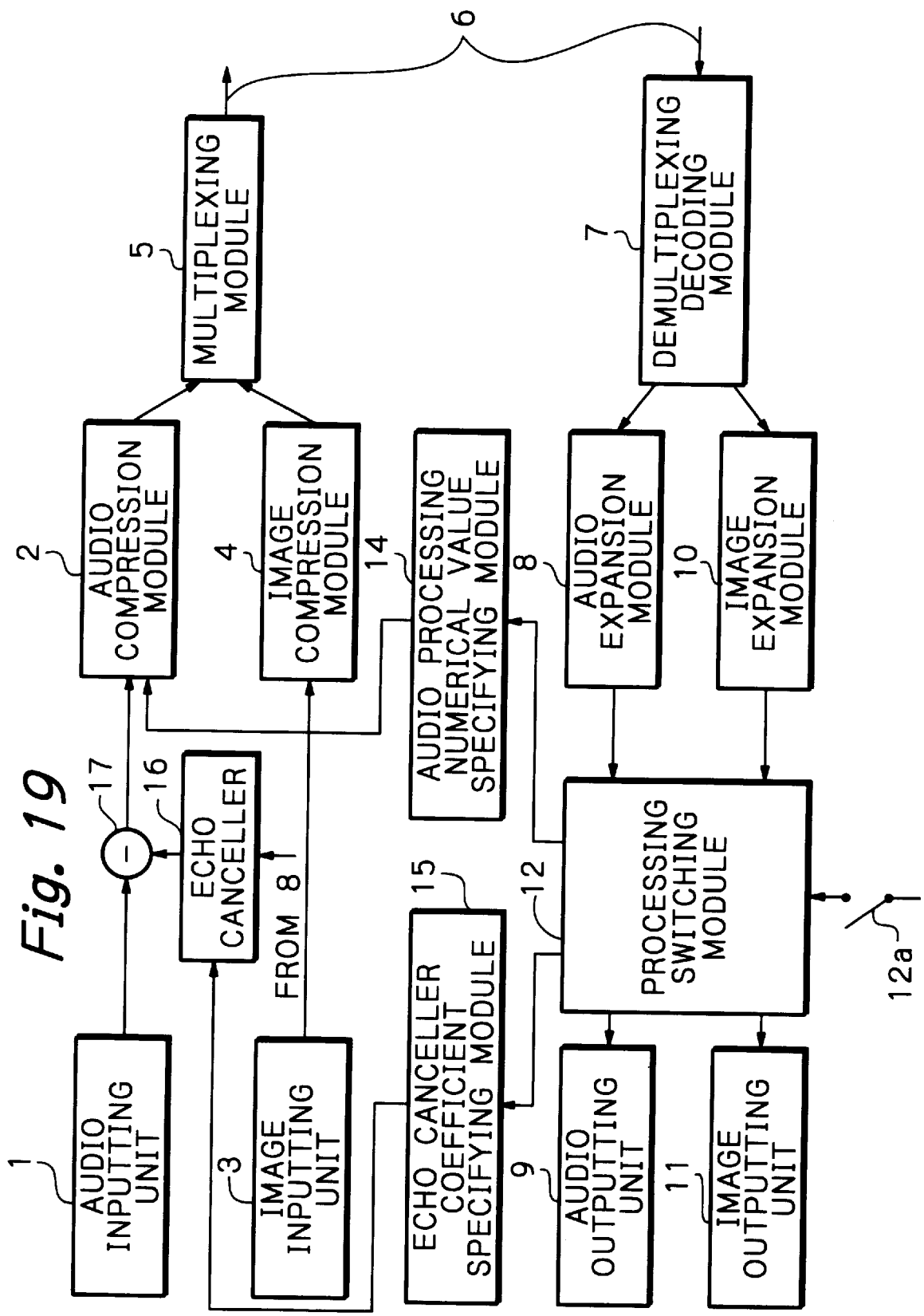

In FIG. 19, which illustrates a sixth embodiment of the video telephone system according to the present invention, the video telephone system of FIG. 9 is combined with that of FIG. 13. As a result, when the mischievous call repelling image processing mode is selected by the user, the user can transmit an echoed harsh voice obtained by processing the original audio data of the mischievous caller with syllables interchanged randomly or interrupted very frequently without seeing and/or hearing the image and/or audio data received from the mischievous caller. As a result, the mischievous caller is forced to hear their own voice and see a processed ugly image, for which the mischievous caller will be charged, so that the mischievous caller will be discouraged to make a mischievous call any further. In other words, a mischievous call can be effectively repelled, and any possible mischievous call can be prevented from taking place.

Figure 20:
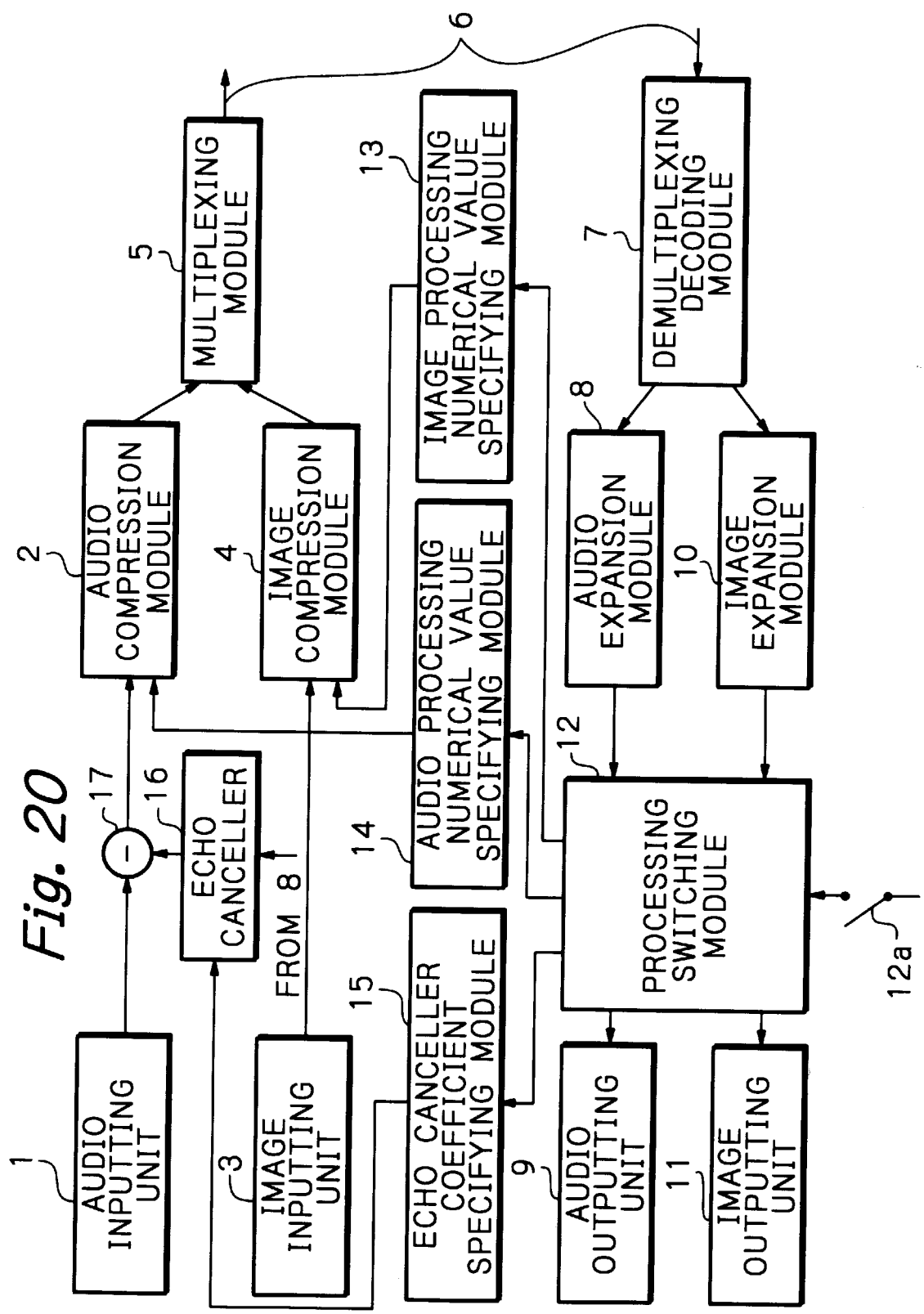

In FIG. 20, which illustrates a seventh embodiment of the video telephone system according to the present invention, the video telephone systems of FIGS. 4, 9 and 13 are combined into one video telephone system. As a result, when the mischievous call repelling image processing mode is selected by the user, the user can transmit an indiscernible image of the mischievous caller obtained typically by turning upside down, laterally reversing and/or blurring the original image back to the mischievous caller along with an echoed harsh voice obtained by processing the original audio data of the mischievous caller with syllables interchanged randomly or interrupted very frequently without seeing and/or hearing the image and/or audio data received from the mischievous caller. As a result, the mischievous caller is forced to hear their own voice and see a processed ugly image, for which the mischievous caller will be charged, so that the mischievous caller will be discouraged to make a mischievous call any further. In other words, a mischievous call can be effectively repelled, and any possible mischievous call can be prevented from taking place.

In the above-mentioned embodiments, each module can be obtained by hardware or software.

As explained hereinabove, according to the invention, the image and voice of a mischievous call are processed by intentionally and randomly modifying the coefficients and the data that have been regulated by the image voice processing operation for the call so that not the original image and voice but an image and a voice obtained by respectively deforming the original image and voice to produce an unpleasant effect are sent to the other end of the communication line to make it unbearable for the mischievous caller unbearable to see the image and hear the voice and thue be discouraged from making a mischievous call any further.

Additionally, any of the above described processing operations for discouraging the mischievous caller can be carried out without providing any additional means in the video telephone system to produce transmission data and only some of the data and some of the coefficients adjusted properly for the operation of the video telephone system are modified to repel the mischievous call so that the function of repelling a mischievous call can be realized simply by adding a slight load on the CPU in addition to the load of the CPU necessary for processing an ordinary call and hence the CPU is relieved of any undesired overload.

I claim:

1. A video telephone system comprising:

an audio inputting unit for inputting first audio data;

an audio compression means for compressing said first audio data to generate compressed audio data;

an image inputting unit for inputting first image data;

an image compression means for compressing said first image data to generate compressed image data;

a multiplexing means for multiplexing said coded audio data and said compressed image data to form a transmission signal;

a demultiplexing means for demultiplexing a reception signal to generate second audio data and second image data;

an audio expansion means for expanding said second audio data to generate expanded audio data;

an image expansion means for expanding said second image data to generate expanded image data;

an audio outputting unit;

an image outputting unit;

an image processing numerical value specifying means for modifying arithmetic coefficients for processing said expanded image data;

a processing switching means for transmitting said expanded audio data and said expanded image data to said audio outputting unit and said image outputting unit, respectively, in a first state, and for transmitting said expanded audio data and said expanded image data to said audio compression means and said image compression means, respectively, in a second state, said expanded image data being transmitted via said image processing numerical value specifying means to said image compression means in said second state.

2. The system as set forth in claim 1, further comprising:

an audio processing numerical value specifying means for modifying arithmetic coefficients for processing said expanded audio data, said expanded audio data being transmitted via said audio processing numerical value specifying means to said audio compression means in said second state.

3. The system as set forth in claim 1, further comprising:

an echo canceller means for negatively-feeding said expanded audio data back to said audio compression means to cancel an echo generated in said audio compression means when said image outputting unit is operated; and an echo canceller coefficient specifying means for modifying arithmetic coefficients for operations of said echo canceller means, said processing switching means operating said echo canceller means in said second state, so that said echo in said audio compression means is boosted.

4. A video telephone system comprising:

an audio inputting unit for inputting first audio data;

an audio compression means for compressing said first audio data to generate compressed audio data;

an image inputting unit for inputting first image data;

an image compression means for compressing said first image data to generate compressed image data;

a multiplexing means for multiplexing said compressed audio data and said compressed image data to form a transmission signal;

a demultiplexing means for demultiplexing a reception signal to generate second audio data and second image data;

an audio expansion means for expanding said second audio data to generate expanded audio data;

an image expansion means for expanding said second image data to generate expanded image data;

an audio outputting unit;

an image outputting unit;

an audio processing numerical value specifying means for modifying arithmetic coefficients for processing said expanded audio data;

a processing switching means for transmitting said expanded audio data and said expanded image data to said audio outputting unit and said image outputting unit, respectively, in a first state, and for transmitting said expanded audio data and said expanded image data to said audio compression means and said image compression means, respectively, in a second state, said expanded audio data being transmitted via said audio processing numerical value specifying means to said audio compression means in said second state.

5. The system as set forth in claim 4, further comprising:

an echo canceller means for negatively-feeding said expanded audio data back to said audio compression means to cancel an echo generated in said audio compression means when said image outputting unit is operated; and an echo canceller coefficient specifying means for modifying arithmetic coefficients for operations of said echo canceller means, said processing switching means operating said echo canceller means in said second state, so that said echo in said audio compression means is boosted.

6. A video telephone system comprising:

an audio inputting unit for inputting first audio data;

an audio compression means for compressing said first audio data to generate compressed audio data;

an image inputting unit for inputting first image data;

an image compression means for compressing said first image data to generate compressed image data;

a multiplexing means for multiplexing said compressed audio data and said compressed image data to form a transmission signal;

a demultiplexing means for demultiplexing a reception signal to generate second audio data and second image data;

an audio expansion means for expanding said second audio data to generate expanded audio data;

an image expansion means for expanding said second image data to generate expanded image data;

an audio outputting unit;

an image outputting unit;

an echo canceller means for negatively-feeding said expanded audio data back to said audio compression means to cancel an echo generated in said audio compression means when said image outputting unit is operated;

an echo canceller coefficient specifying means for modifying arithmetic coefficients for operations of said echo canceller means, a processing switching means for transmitting said expanded audio data and said expanded image data to said audio outputting unit and said image outputting unit, respectively, in a first state, and for transmitting said expanded audio data and said expanded image data to said audio compression means and said image compression means, respectively, in a second state, said processing switching means operating said echo canceller means in said second state, so that said echo in said audio compression means is boosted.

* * * * *